United States Patent [19]

Song

[11] Patent Number: 5,749,276
[45] Date of Patent: May 12, 1998

[54] CUTTING APPARATUS AND AUTOMATIC CUTTING SYSTEM OF BLADE'S RAW MATERIAL OF BLANKING DIE

[76] Inventor: Byung-Jun Song, 1203-1101 Jukong Apt. Chulsandong, Kwangmyungshi, Kyunggi-do, Rep. of Korea

[21] Appl. No.: 698,758

[22] PCT Filed: Dec. 10, 1992

[86] PCT No.: PCT/KR92/00074

§ 371 Date: Jul. 21, 1993

§ 102(e) Date: Jul. 21, 1993

[87] PCT Pub. No.: WO93/11900

PCT Pub. Date: Jun. 24, 1993

Related U.S. Application Data

[63] Continuation of Ser. No. 480,702, Jun. 7, 1995, abandoned, which is a continuation of Ser. No. 90,080, Jul. 21, 1993, abandoned.

[30] Foreign Application Priority Data

Dec. 11, 1991 [KR] Rep. of Korea ............ 91-22620
Dec. 17, 1991 [KR] Rep. of Korea ............ 91-23178

[51] Int. Cl.$^6$ .................................................. B26D 5/12
[52] U.S. Cl. .................. 83/76.9; 83/549; 83/551; 234/116
[58] Field of Search ............... 83/76.1, 76.9, 83/549, 550, 551, 555; 234/111, 116, 117

[56] References Cited

U.S. PATENT DOCUMENTS

| | | | |
|---|---|---|---|
| 4,091,700 | 5/1978 | Cloup | 83/549 X |
| 4,168,644 | 9/1979 | Leibinger et al. | 83/573 |
| 4,267,758 | 5/1981 | Muhr et al. | 83/571 |
| 4,475,424 | 10/1984 | Kouno et al. | 83/549 |
| 4,562,754 | 1/1986 | Archer et al. | 76/107 C |
| 4,623,089 | 11/1986 | Scott | 234/116 X |
| 4,700,441 | 10/1987 | Ikeda et al. | 83/549 X |
| 4,773,284 | 9/1988 | Archer et al. | 76/4 |

FOREIGN PATENT DOCUMENTS

| | | | |
|---|---|---|---|
| 88576 | 5/1986 | European Pat. Off. | |
| 2540422 | 8/1984 | France | 83/549 |
| 1 502 721 | 1/1970 | Germany | 83/549 |
| 2838733 | 3/1980 | Germany | |
| 3832215 | 3/1990 | Germany | |
| 621959 | 3/1981 | Switzerland | |
| 8501896 | 5/1985 | WIPO | |

*Primary Examiner*—Maurina T. Rachuba
*Attorney, Agent, or Firm*—Bell, Boyd & Lloyd

[57] ABSTRACT

The present invention relates to a cutting apparatus a used in a paper blanking die for manufacturing paper box and the like and an automatic cutting system using this cutting apparatus. This cutting apparatus comprises: more than two kinds of cutters having different cutting out or cutting off patterns arranged side by side laterally against a feeding direction of the raw material; a cutter guiding section for guiding each cutter so as to be able to perpendicularly move against a plane of the cutters toward a plane of the raw material; a cutter die for supporting raw material against the pressing force of the cutter and simultaneously interacting with the cutter whereby executing the cutting work of the raw material; and a cutter for selecting such that only any one of the cutters is pressed.

17 Claims, 6 Drawing Sheets

CUTTING APPARATUS AND AUTOMATIC CUTTING SYSTEM OF BLADE'S RAW MATERIAL OF BLANKING DIE

This is a continuation of application Ser. No. 08/480,702, filed on Jun. 7, 1995, abandoned, which is a continuation of application Ser. No. 08/090,080, filed on Jul. 21, 1993, abandoned.

TECHNICAL FIELD

The present invention relates to a cutting apparatus of blade's raw material used for a paper blanking die for manufacturing paper box and the like and an automatic cutting system employing this cutting apparatus, and more particularly to a multi-purpose cutting apparatus capable of obtaining various cutting patterns in a single system and an automatic cutting system thereof.

BACKGROUND ART

The blanking die used for cutting out and forming a paper pattern for manufacturing a paper box and the like consists of a board made of a plate material of wood and the like, and a multiplicity of blades, i.e., so called Thomson blade, to be inserted along a plane outline of a desired paper box on the board. The blade's raw material is a plate material of band shape, on which blade portion(s) of a single blade at its one side or double blades at both sides are formed, and which passes through a number of cutting and bending operations. Therefore, thereafter it is fixed by inserting into a pierced groove formed with a predetermined plane form by a laser process on the board such that said blade portion(s) are protruded with a predetermined height. And, the cut area shape of the blade's raw material may either have a lip shape directed inward or outward in accordance with the requirement, or a notch or bridge cutting which cuts off as much as a predetermined width is also carried out.

Heretofore, to obtain various cut patterns in one blade's raw material as above, a cutting apparatus a required number of the cutters corresponding to the cutting patterns had to be prepared. Then the work had to be done by moving these in turn, or the work had to be done by continuously changing the cutter at one cutting apparatus. A multi-purpose cutting apparatus has been known which has been provided with a plurality of cutters for straight line cutting, lip cutting or bridge cutting in radial form to a rotatable supporting means, and then carrying out desired cutting work by rotating one of the cutters to a cutting work by rotating one cutter of them to a working position.

However, even in this multi-purpose cutting apparatus, to change to a different cutter, a cut blade has to be removed from a working position and then a cutter fixing means, has to be released, there after work has to be carried out with the changed cutter. Accordingly, there has been a disadvantage that where various cutters have to be used, the work had to be frequently stopped, and then the cutter had to be changed.

And, in manufacturing a blanking die, a precision and automated manufacturing of the blanking die has progressed by designing a plane pattern of desired paper pattern at CAD and by working a pierced groove of the board by using a laser processor on the basis of the prepared CAD design data.

However, in a field for cutting and bending the blade raw material to be inserted by fitting into a pierced groove of a pattern of the blanking die formed by an automated system, such as laser processor, the automation is still inadequate and substantially depends on a skill of an operator. As an attempt for the automation of the cutting work, heretofore various systems have been offered, but an automated system capable of continuously obtaining various cutting patterns in a single equipment has not yet been developed.

DISCLOSURE OF THE INVENTION

Accordingly, it is an object of the present invention to solve the problems of such conventional blade's raw material cutting apparatus and to provide a multi-purpose cutting apparatus capable of continuously executing the cutting work of various patterns without frequent changing of cutters in a single apparatus.

Another object of the present invention is to provide a multi-purpose cutting apparatus capable of automatically working by cutting the blade's raw material to various cutting patterns on the basis of inputted data from a CAD system and the like.

In order to attain above objects, the multi-purpose cutting apparatus of blade for die cutting in accordance with the present invention comprises: cutters of more than two kinds having mutually different cutting out or cutting off patterns arranged side by side laterally to a feeding direction of the blade's raw material; a cutter guiding section for guiding each cutter to be able to perpendicularly move against a plane of said blade's raw material; pressing means for perpendicularly moving and pressing any one of said cutters toward the plane of said blade's raw material; a cutter die for supporting said blade's raw material against the pressing force of said cutter and simultaneously executing a cutting work of the blade's raw material by interacting with said cutter; and cutter selecting means for selecting such that only one of said cutters is pressed by said pressing means. Here, each cutter is made to be moved to return resiliently by a spring, so that a return of the cutter is simple. As used herein, and in the appended claims, "cutting patterns" includes cutting out or cutting off patterns.

And, the cutter selecting means preferably includes: a hydraulic pressure member which is placed between the pressing means and each cutter and makes cutting work by the cutter done by transferring a pressing force of said pressing means to a corresponding cutter; hydraulic pressure member driving means for selectively moving each hydraulic member to any one position among said pressing force transferable position and a position which does not transfer the pressing force to make the cutting work impossible; and control means for controlling said hydraulic pressure member driving means. And, said hydraulic pressure member driving means further preferably includes a fluid pressure cylinder such as an air cylinder which is fixedly attached to said each cutter and for forwardly or backwardly moving said corresponding hydraulic pressure member perpendicularly to the pressing direction of said pressing member. Control means of said hydraulic pressure driving means includes selection switching means for selectively driving each corresponding hydraulic pressure member driving means of said cutters, so that the selection switching operation can be easily executed. It is advantageous to make the hydraulic pressure member to be moved forward and backward on the hydraulic plane of each cutter.

In relation to the different working position of said each cutter, it is desirable to include means for controlling a cutting position of the blade's raw material, for instance, a correcting and complementing scale rules so as to easily compensate a feeding quantity of the blade's raw material and to be able to execute the cutting work.

Other than the cutter for cutting work of the blade's raw material, it is desirable to include cutting-off cutters for various notch processing, in order to form a thin and long notch for reducing a working or bending force of the bridge portion, or to form a marking for indicating a bending position in a bending machine. Particularly the bending can be easily executed at an exact position in a post bending work by a marking cutter capable of exactly forming the bending position.

In order to accomplish the multi-purpose automatic cutting of the blade's raw material, in a blade's raw material automatic cutting system including said cutting apparatus for cutting out or working by cutting off of the blade's raw material for a blanking die, the invention provides a blade's raw material automatic cutting system comprising: a blade's raw material feeding device for feeding in a measured way the blade's raw material to be cut out and worked to said cutting device; working data inputting means for inputting the data with regard to kinds of cutting work to execute a working by cutting out or cutting off to the blade's raw material and a position of working by cutting out or cutting off, a bending position and a bending condition; and a control device for controlling said cutting device and the blade's raw material feeding means on the basis of said inputted wording data.

Here, said blade's raw material feeding means may include a pair of feeding rollers for resiliently pressing and contacting by placing the blade's raw material between them, and a driving motor for rotatably driving said feeding rollers in a measured way. And, said working data inputting means includes data converting means which receives a pattern designing data of paper patterns to be cut off by a blade or a laser working data of paper box blanking die whereby converts into said data for working by cutting, so that the data made at CAD and the like can be directly utilized to the cutting work of the blade's raw material. And, said control means includes a material property data memory for storing a material property data of the blade's raw material such as an expansion coefficient data of the blade's raw material in accordance with the bending condition, and the position of working by cutting out or cutting off or a bending position in response to said inputted working data is compensated on the basis of said data stored to the material property data memory, so that some operation error of material cutting and bending or a loss of the material are reduced and a desired cutting and bending work can be carried out at an exact position.

MODE FOR CARRYING OUT THE INVENTION

Hereinafter, a preferred embodiment of the present invention will be described in more detail with reference to the accompanying drawings.

Figure 1:
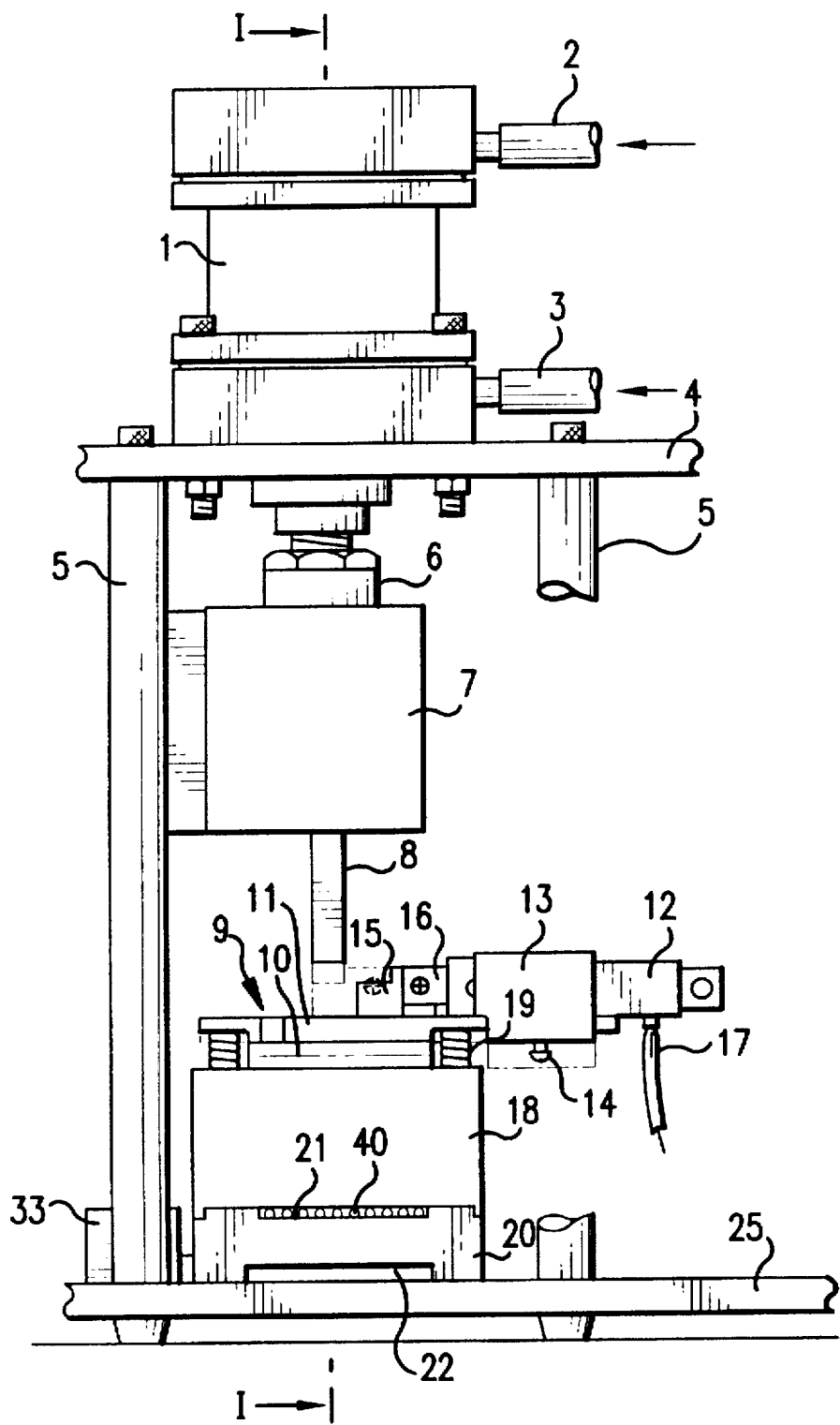
FIG. 1 is a front elevational view of a blade's raw material cutting apparatus in accordance with the present invention.
Figure 2:
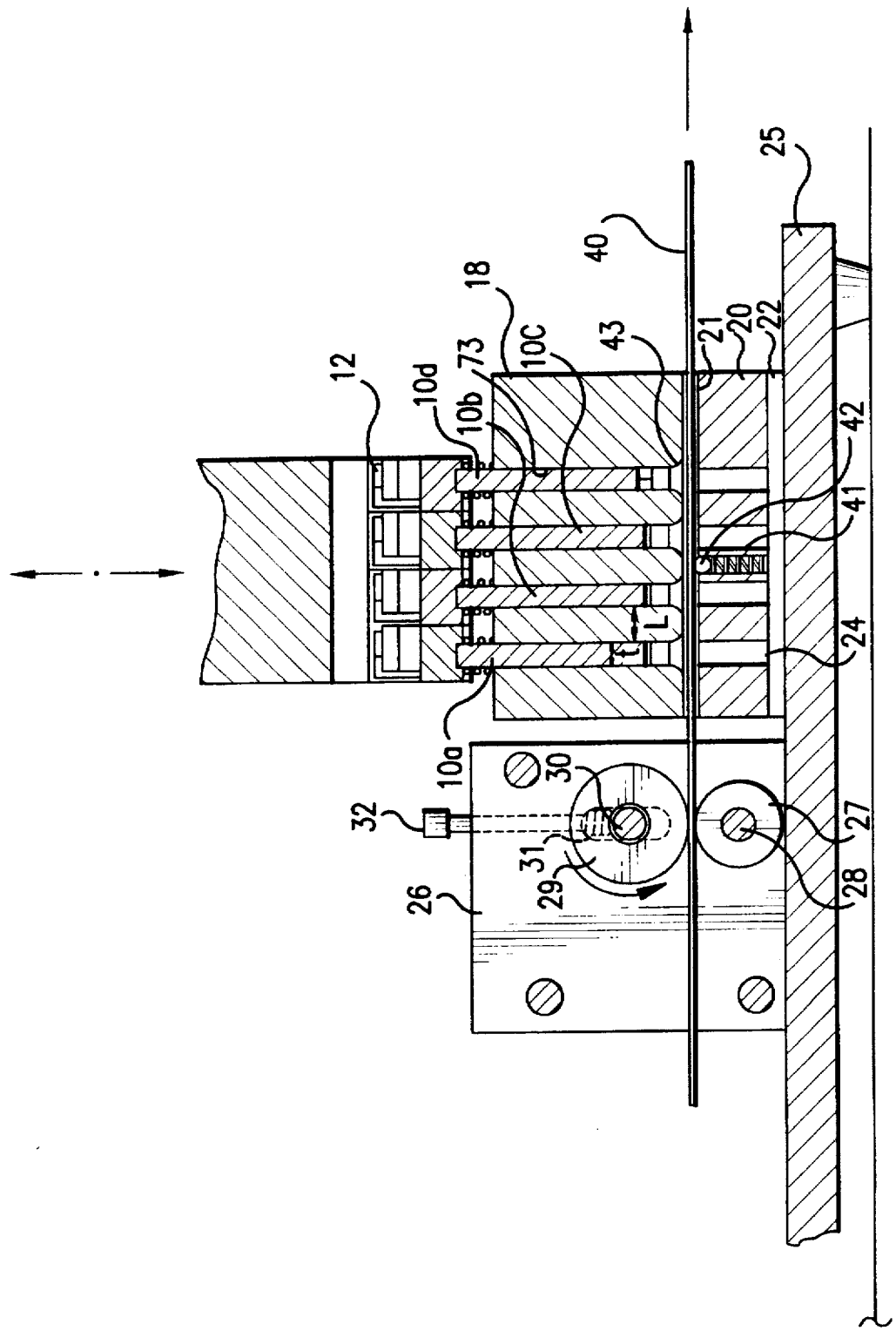
FIG. 2 is a cross sectional view taken along I—I line of FIG. 1.

FIG. 1 is a front elevational view, and FIG. 2 is a cross sectional view taken along I—I line of FIG. 1. As can be seen from FIG. 1, the cutting apparatus of the invention includes an air cylinder 1 controllably driven through two alternative compressed air inlet and outlet tubes 2,3, and an arbor 6 for executing a pressing operation by perpendicularly moving up and down directions by the air cylinder 1. The arbor 6 is ensured with a stable linear movement by an arbor guiding member 7, and a bottom front end portion of the arbor 6 serves as a pressing means 8 for pressing a cutter assembly which will be described hereinafter.

Figure 3:
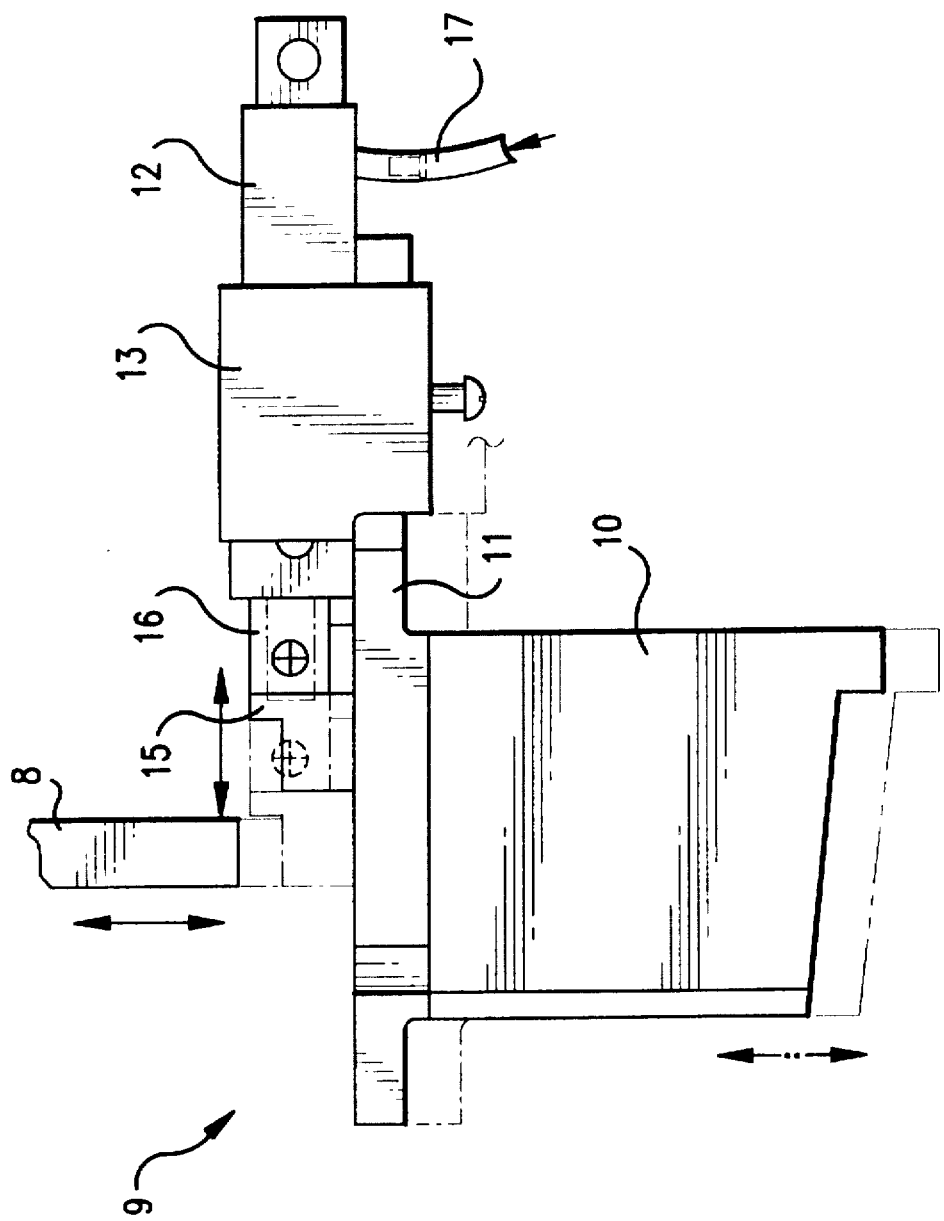
FIG. 3 is a magnified schematic drawing of a cutter assembly.

Below the pressing means 8 of the arbor 6 there is provided four cutter assemblies 9 within its width region (refer to FIG. 2). Each cutter assembly 9 includes a cutter section 10, cutter supporting section 11, one way air cylinder 12, cylinder fixing means 13, and hydraulic pressure member 15 (refer to FIG. 3). The cutter supporting section 11 for fixedly supporting the cutter section 10 is supported on a cutter guiding member 18 through a compression spring 19.

The air cylinder 12 fixed by the fixing means on the cutter supporting section 11 is driven by compressed air fed through a compressed air tube 17, and it makes a hydraulic member 15 connected to its push rod 16 to forwardly and reversely slide horizontally on the cutter supporting section 11. The air cylinder 12 drives the hydraulic pressure member 15 to an advanced position by compressed air (dots line of FIG. 1), and when compressed air is removed, the hydraulic pressure member 15 is returned by the spring contained within the cylinder 12.

Those which show as examples the kinds of cutters capable of applying in the blade's raw material cutting apparatus of the present invention and shapes of the blade's raw material cut by them are FIG. 4. A cutter 10a of FIG. 4(A) is a so-called lip cutting cutter, and a cross sectional view of the blade's raw material 40 cut by this remains protruding in lip form with the blade portion of the blade's raw material 40 as shown. A cutter 10b of FIG. 4(B) is a straight line cutter, and it cuts the blade's raw material 40 in straight line whereby its cut surface has a linear form. A cutter 10c of FIG. 4(C) is a bridge cutter which cuts off a part of the width but leaves raw material 40 to provide a bridge form. This bridge cutter 10c partially cuts the blade such that the blade can be set on the board.

Figure 4A:
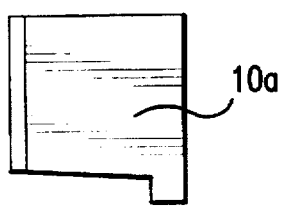
FIGS. 4A-F are diagrams of front view and bottom view of examples of the blade's raw material used in the cutting apparatus of the present invention and shapes of the blade which are cut and worked by them.
Figure 4B:
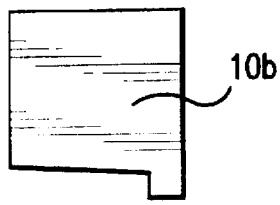
Figure 4C:
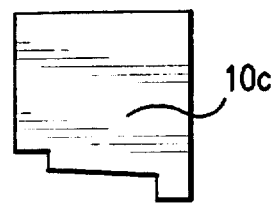
Figure 4A:
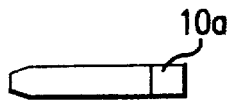
Figure 4B:
Figure 4C:
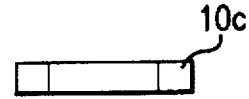
Figure 4A:
Figure 4B:
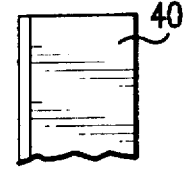
Figure 4C:
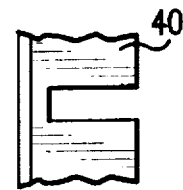
Figure 4D:
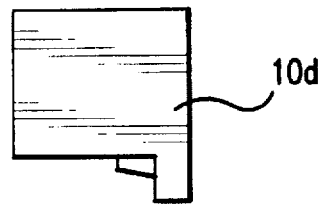

And, a cutter 10d of FIG. 4(D) is a marking cutter of a bending position which is newly applied in the cutting apparatus of the present invention. Heretofore, an operator has directly measured a position to bend, and on the basis of this, he has adjusted a stopper by a vernier calipers and the like attached to a bending machine, and aligned a front portion of the blade's raw material to the stopper and then executed the bending work. This marking cutter 10d is a thing for solving the inconvenience in the conventional bending machine. The cutter 10d makes an bending position setting of the blade's raw material by cutting off an edge portion of the blade's raw material 40 with a small depth and by executing the bending work by aligning this cut off portion to a corresponding protruded portion provided in the bending machine. To reduce a risk of abrasion loss arising from the cutting blade portion of the marking cutter 10d being sharply formed, as shown in FIG. 4(E), a marking cutter 10e can be used which eliminates the sharp portion by rounding the tip end portion.

Figure 4E:
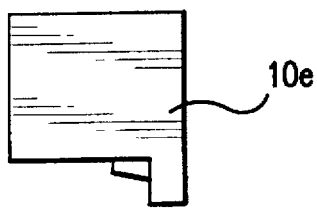
Figure 4F:
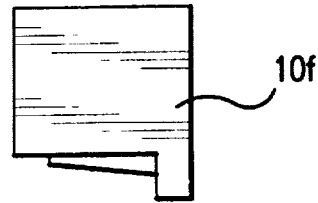
Figure 4D:
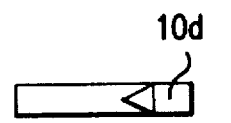
Figure 4E:
Figure 4F:
Figure 4D:
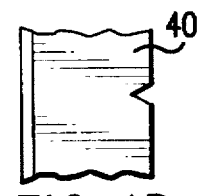
Figure 4E:
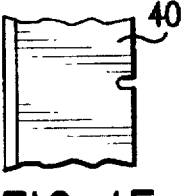
Figure 4F:
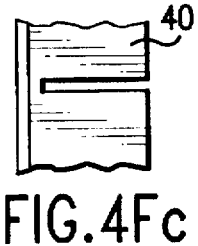

A notch cutter 10f of FIG. 4(F) serves to reduce a bending force in the bending machine, as well as performing a bending position indicating function in a manner similar as the marking cutters 10d and 10e of FIGS. 4(D) and 4(E). Accordingly, for a place which is difficult to work by a bending die having a sufficient strength, for example, when a space for operation of the bending die by a complicated bending shape is narrow, a thin and long notch is formed by this notching cutter 10f and thereafter the bending work can be carried out by using a small bending die relatively lower in strength.

The cutter guiding member 18 accommodates as may be seen from FIG. 1 and FIG. 2 each cutter section 10 of four cutter assemblies 9 laterally disposed in parallel side by side arrangement against a feeding direction of the blade's raw material 40 to be worked by cutting to be able to move in perpendicular direction. For this purpose, the cutter guiding member 18 has guiding holes 23 as much as an amount corresponding to the number of cutters.

To a lower portion of the cutter guiding member 18 there is provided on a base board 25 with a cutter die 20 which supports the cutter guiding member 18 and for executing a cutting out or cutting off work of the blade's raw material by interacting with the cutter section 10 of the cutter assembly 9. The cutter die 20 has holes 24 having a cross sectional pattern corresponding to the cutter shape to accommodate a part of a front end portion of the cutter section 10 when cutting for the interaction with the cutter section 10 (refer to FIG. 2). The cutter die 20 includes a blade's raw material guiding groove 21 for guiding a conveyance of the blade's raw material 40 at its upper portion, and it is formed with a chip receiving portion 22 capable of collecting the cut blade's raw material chips at its lower portion.

On the other hand, as may be seen from FIG. 2, a blade's raw material feeding section is provided side by side with a cutting work section of the blade's raw material 40 consisted of the cutter guiding section 18 and the cutter die 20. The blade's raw material feeding section includes feeding roller 27 driven by a driving motor which is not shown, a pressing roller 29 for pressing the feeding roller 27 by placing the blade's raw material 40 between them to be worked by cutting, and a supporting wall 26 for supporting said two rollers 27,29 at both sides.

The feeding roller 27 receives a rotating power from the driving motor through its rotary shaft 28 and feeds the blade's raw material 40 to its advancing direction by a rotating frictional force with the blade's raw material. The frictional force between the blade's raw material 40 and the feeding roller 27 is provided by the pressing roller 29 located at an upper portion of the feeding roller 27. The pressing roller 29 is mounted so as to be freely rotatable around a rotary shaft 30 rotatably fixed to the supporting walls 26. And, the rotary shaft 30 of the pressing roller 29 is resiliently urged downward by a compression spring 31 and a compression spring adjusting screw 32, and the pressing roller 29 presses the feeding roller 27 and the blade's raw material 40 by this compression.

A feeding quantity of the blade's raw material 40 can be automatically and precisely controlled by a rotating quantity of the feeding roller 27 through the driving motor of the feeding roller 27. Otherwise, it is of course possible also either to handle the feeding roller by manually rotating or to manually feed without passing through the feeding roller 27. For this manual feeding, a blade's raw material cutting position determining means having a vernier calipers and the like as in the conventional cutting apparatus should be provided to exactly specify different working positions of each cutter 10a, 10b, 10c, and 10d.

The blade's raw material cutting apparatus of the present invention having this construction operates as follows. First, a cutting pattern to be executed to the blade's raw material 40, that is, the kind of cutter and its position are determined. In case of an embodiment shown, since four kinds of cutters as shown in FIG. 4 are provided, firstly any one of these is selected. When a kind of cutter is selected, a feeding quantity of the blade's raw material 40 is determined automatically or by an appropriate calculation in relation to a cutting position by considering a relative working position of the cutter against an advancing direction of the blade's raw material. According to this, the blade's raw material 40 is conveyed by either pertinently driving the driving motor of the feeding roller 27 or manually, and feeds compressed air to the air cylinder 12 provided to a corresponding cutter. Then, the hydraulic pressure member 15 connected to the push rod 16 of the cylinder 12 moves by sliding to an advancing direction whereby comes to be located immediately under the pressing section 8 attached to the arbor 6 of the pressing air cylinder 1. Simultaneously with this, the pressing section descends when the pressing air cylinder 1 is driven by the compressed air, said hydraulic pressure member 15 is pressed, and the hydraulic pressure member 15 transfers its pressing force to a corresponding cutter section 10, and the cutter section 10 descended by following the guiding hole slot 23 of the guiding member 18 in accordance with that comes to cut the blade's raw material 40 to a predetermined pattern which resides between them.

The blade's raw material 40 which has completed a primary cutting work by doing like this further advances in a measured way by the feeding roller 27 whereby a desired secondary cutting work is carried out at a predetermined location. By repeating these processes, the cutting work of various cutting patterns can be continuously carried out.

Figure 5:
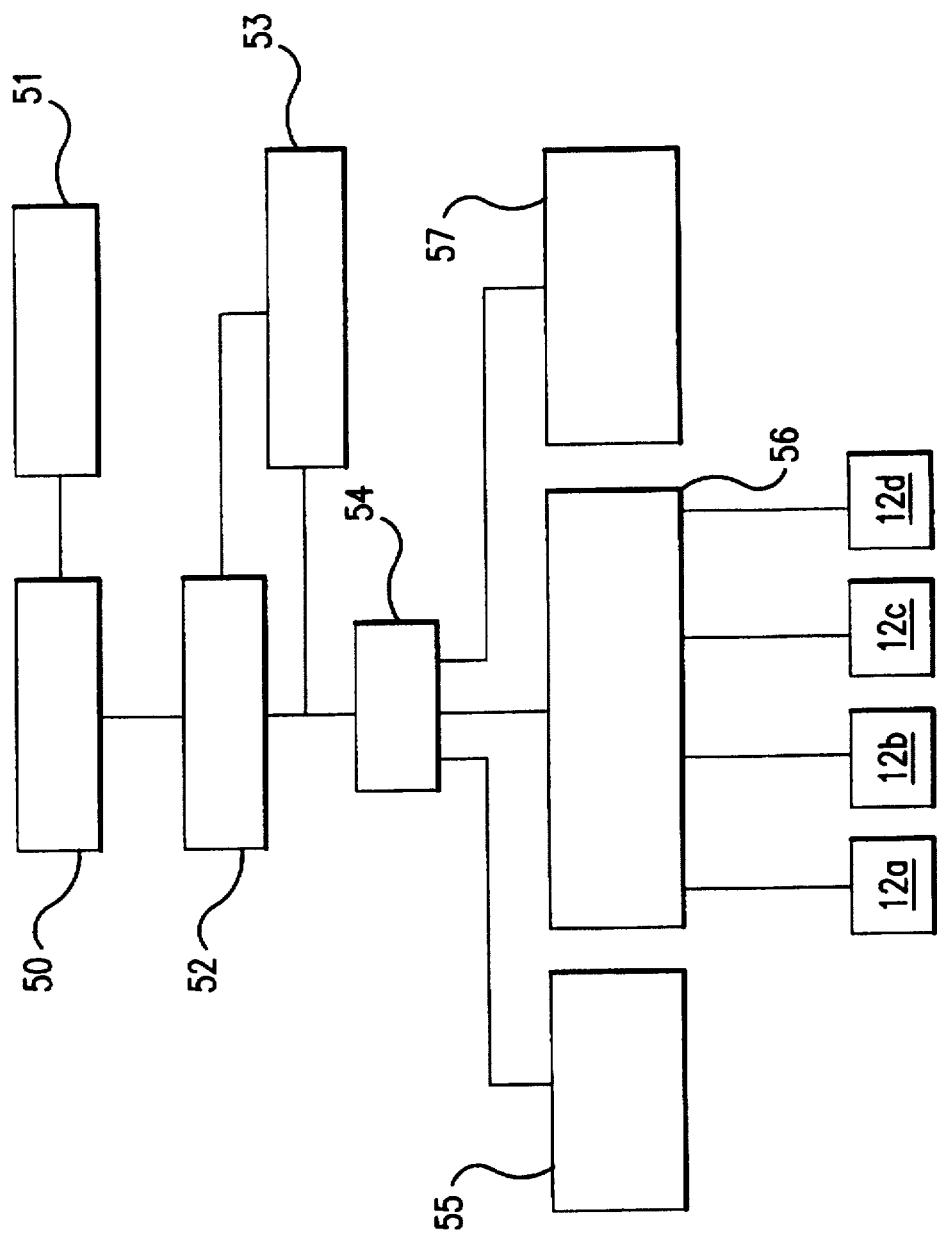
FIG. 5 is a block diagram of a manufacturing process of an automatic cutting system in accordance with the present invention.

FIG. 5 shows a control system for automatically executing the work of aforementioned cutting apparatus in a block diagram. In the illustrated embodiment, the data of CAD system utilized for the automatic laser process forming the pierced groove of the blanking die is utilized as automatic control data of this blade's raw material cutting system. The data of CAD system 50 which has made an outline drawing on a desired plane pattern is fed to a laser processing system 51 for the pierced groove working of the blanking die, and simultaneously it is fed also to a data converting section 52 for a cutting work of the blade's raw material 40.

The data converting section 52 converts the two dimensional data in the CAD system 50 into one dimensional data for a linear cutting work of the blade's raw material 40. Accordingly, the kind of the cutter and the cutting position to be applied to the blade's raw material 40 are exactly determined from the CAD data. For this purpose, it is reflected to a conveying quantity of the blade's raw material by judging collectively a relative position of the cutters which are arranged in parallel to the direction of the movement of the raw material, side by side for this and a working position of the cutter considered the rounding quantity where a bending process is included.

As in the embodiment illustrated in FIG. 1 and FIG. 2, for including a marking cutter for indicating a bending position, a position to be bent with the blade's raw material 40 is indicated by notching and thereby a post working at the bending machine can be easily carried out. By the way, in a time of bending work of the blade's raw material, a difference would be occurred between a calculated size and a practical size due to a working transformation of the blade's raw material. This dimensional difference varies in accordance with an expansion rate of the material, a bending angle and a rounding quantity etc., and it has to be necessarily considered not only for exactly specifying the bending position of the blade's raw material but also for making the cutting work position thereafter to be exactly aligned.

Accordingly, in the present invention, a data memory 53 is included which stores a material property such as a previously provided expansion rate by considering various bending conditions, so as to be able to pertinently compensate the marking position and the cutting or bending position of the bending work portion to be notched by the marking cutter on the basis of the expanded quantity of the material in accordance with the bending work condition. The data memory 53 is combined with the cutting work data from the data converting section 52 and fed to the control section 54.

The control section 54 controls the cutting apparatus and the blade's raw material feeding section on the basis of the cutting work data from the data converting section 52 and the material property memory 53. It controls a feeding roller driving section 57 for driving in a measured way the blade's raw material feeding roller 27 in accordance with the calculated and compensated data, and controls an air cylinder switching section 56 for feeding compressed air to the air cylinder 12 of the cutter selected in accordance with the cutter selecting data to a conveyed blade's raw material. And, it makes the blade's raw material to be conveyed to a predetermined position and a pressure applying press driving section 55 to be controlled in a state that a cutter is selected, so that the cutting work can be made.

Figure 6A:
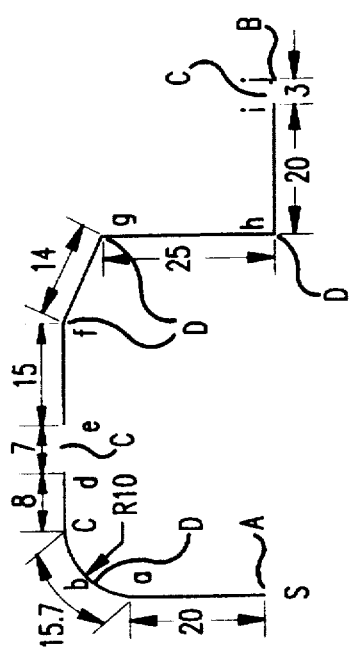
FIG. 6A-B are diagrams of a practical example for illustrating a working process of the automatic cutting system of this invention, which shows an offered CAD data FIG. 6(A) and a shape of the blade's raw material FIG. 6(A) worked by cutting on the basis of it.
Figure 6B:
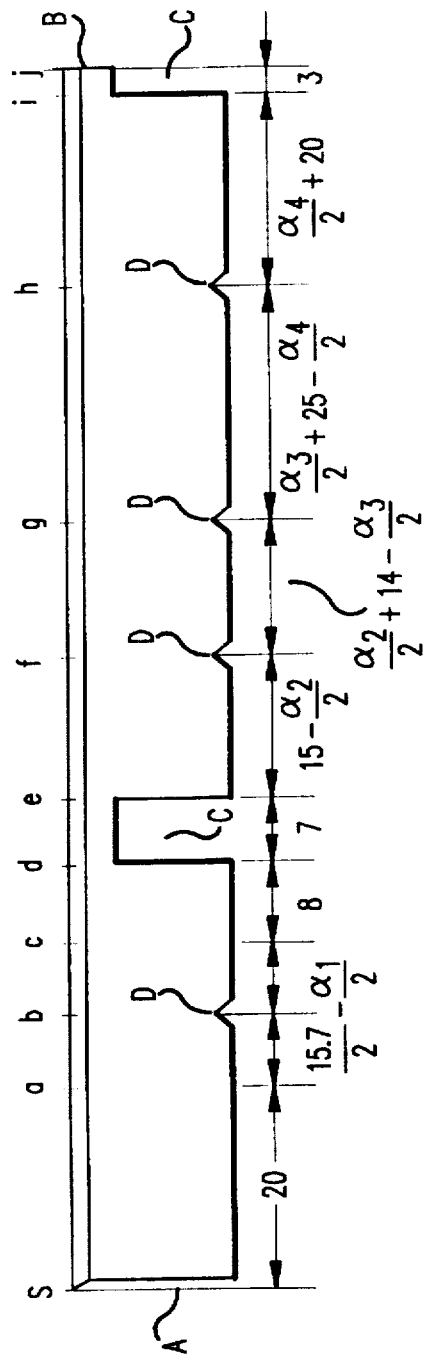

The working process in this automatic cutting system will be described by citing a practical example as shown in FIG. 6.

FIG. 6(a) is two dimensional data for a laser process made at CAD system 50. A cutting process at the cutting apparatus continuously advances by starting from s point through a to j points, and A,B,C, and D indicates respectively a lip cutter 10a, straight line cutter 10b, bridge cutter 10c, and marking cutter 10d.

The initially fed blade's raw material is firstly worked by a lip cutting process (A) by the lip cutter 10a designated as an initial cutter in a processing data in accordance with the control of the control section 54. Successively, a marking cutter process at b point which is an intermediate point of the bending portion for indicating a 90 degree bending portion of R10 is executed to the blade's raw material which has lip cutting processed. A moved position of b point against s point is determined as $(20+15.7/2-\alpha_1/2)$ by summing a distance between s~a and a~b and compensating a material expansion rate $(\alpha_1)$ by a corresponding bending process. And, since the lip cutter 10a and the marking cutter 10d are distanced away with a predetermined distance, this should also be considered. Assuming that thickness of each cutter is uniformly t and gap between the cutters is also uniformly l, a distance that the blade's raw material has to be actually moved for the marking at b point becomes $(20+15.7/2-\alpha_1/2+3.5t+3l+\beta)$ when considering a protruded quantity $\beta$ of the lip. The blade's raw material which has moved in measuring way said distance by the blade's raw material feeding section 56 is cut off as FIG. 5(b) at b point position, as the air cylinder 12d is driven by the cutter selection switching section 56 and simultaneously with this the pressure applying press driving section 55 operates whereby presses the marking cutter 10d.

In accordance with the calculating process similar to the above, the blade's raw material moves again by $(15.7/2+\beta+7-\alpha_1/2)-(1.5+l)$, and the bridge cutting (C) is executed by the bridge cutter 10c at said position.

The control section 54, repeating the above process, pertinently controls the blade's raw material feeding roller driving section 57, the cutter selecting air cylinder switching section 56, and the pressure applying press driving section 55, so that the corresponding cutting work can be made at an exact position. And, in relation to the relative position of each cutters 12a, 12b, 12c and 12d and their working position, the working position and time point are appropriately arranged sequentially so as not to have a necessity to make the blade's raw material to be reversely moved.

The cutting work is sequentially progressed in accordance with the control of the control section 54, and finally it terminates by the straight line cutting (B). The cutting process works of all the blade's raw material are started and terminated by the lip cutter 10a or the straight line cutter 10b. When one time cutting work is completed, the control section repeats same work as much as a required on the basis of inputted data.

In the embodiment shown and described before, a single press device is used for the pressing of the cutters, and the air cylinder attached to each cutter used as the cutter selecting means is selectively switched and driven whereby the cutting work is executed, but it is possible to progress the desired cutting work by attaching respectively an independent press device to each cutter and driving by switching selectively these press devices.

And, the air cylinder is used by attaching to each cutter as a cutter selecting means, but a mechanically controlled lever type link mechanism or an electromagnetically controllable solenoid device and the like can be utilized.

INDUSTRIAL APPLICABILITY

As described above, since the blade's raw material in accordance with the present invention includes various cutting pattern cutters in a single equipment and these are selectively used so that various cutting works of the blade's raw material continuously fed can be continuously executed, it provides various effects such as an improvement of workability, a reducing of necessary equipment number, a space saving etc. Besides, a laser processing of the board and the cutting work of the blade's raw material can be simultaneously progressed by utilizing CAD data and the like by the blade's raw material automatic cutting system including this cutting apparatus, and is an excellent effect that the cutting work can be completely automated. And, when including a marking cutter for the bending process, since a transformation expanding rate of the material is pertinently compensated whereby the cutting out and cutting off works are executed to the exact position and a notch for indicating the bending position is formed, this not only enables the bending work to be easily and precisely carried out, but also the material loss can be reduced by efficiently utilizing the material.

I claim:

1. A cutting apparatus for cutting of band shaped raw material, consisting essentially of:
    at least two cutters having different cutting shapes located solely above the raw material, said cutters being in a side-by-side array with each one of said cutters being independently movable and having blade or cutting edges in a plane parallel to a feeding direction of said raw material and receiving portions directly below and axially aligned with a cutter and directly below the raw material;

a stationary cutter guiding section including (1) a plurality of vertical guide slots, each one of the guide slots having a respective one of said cutters therein for guiding said cutters to perpendicularly move downwardly against a plane of said raw material, and (2) means for biasing said cutters upwardly;

means including an element spaced above said cutters for applying force to perpendicularly move and press said cutters into said plane of the raw material;

a cutter die for supporting said raw material against the pressing force of said cutters and simultaneously interacting with said cutters to execute a cutting pattern on the raw material;

a plurality of hydraulic pressure members located lower than and to one side of said element, each one of said pressure members being selectively movable between said element and a respective one of said cutters for transferring the pressing force to the respective one of said cutters;

driving means for selectively moving the pressure members beneath said element;

a control section for controlling said driving means and each said receiving portion collecting cut raw material.

2. A cutting apparatus as defined in claim 1, further comprising:

means for feeding the blade's raw material to be worked to said cutting apparatus;

processing data inputting means for inputting data in relation to kind, and cutting out or cutting off processing position, a bending position and a bending condition for cutting out or cutting off the band shaped raw material; and means for controlling said cutting apparatus and the raw material feeding means on the basis of said inputted processing data;

means for (1) identifying a bending position, (2) using a marking cutter to notch the blade's raw material at the bending position, (3) aligning the notch with a protrusion on a bending device, and (4) bending the raw material in the bending device.

3. A cutting apparatus as defined in claim 2, wherein the notch cutter provides a long thin notch in the raw material to reduce force required to bend the raw material.

4. A cutting apparatus as defined in claim 1, wherein the control section of said hydraulic member driving means comprises:

selective switching means for selectively driving the hydraulic pressure member driving means.

5. A cutting apparatus as defined in claim 1 further consisting essentially of:

a raw material feeding device for feeding in measuring way the raw material to be worked by cutting to said cutting apparatus;

processing data inputting means for inputting data in relation to kind and cutting out or cutting off processing position, a bending position and a bending condition for cutting out or cutting off the band shaped raw material; and means for controlling said cutting apparatus and the raw material feeding device on the basis of said inputted processing data.

6. A cutting apparatus as defined in claim 5, wherein said raw material feeding device comprises:

a pair of feeding rollers which places the raw material between them and resiliently pressing and contacting the raw material; and a driving motor for rotatably driving in measuring way said feeding rollers.

7. An automatic cutting apparatus as defined in claim 5, wherein said processing data inputting means comprises:

data converting means which receives pattern designing data of a paper pattern to be cut off and formed by one of the cutters or a laser processing data of a paper container blanking die which converts into pattern designating data.

8. A cutting apparatus as defined in claim 4, wherein the control section includes a material data memory for storing material data of the raw material, optionally expansion rate data of the raw material according to a bending condition, and which compensates for each cutting out or cutting off processing position or bending position in accordance with inputted processing data on the basis of data stored in said material data memory.

9. A cutting apparatus as defined in claim 1 wherein said cutter guiding section is fixedly located above said raw material with said plurality of vertical guide slots being positioned in a side-by-side array with each one of the guide slots being transverse to a feeding direction of said raw material.

10. A cutting apparatus as defined in claim 9 wherein said cutters are planar in shape, and said apparatus includes at least two cutter assemblies; each one of the cutter assemblies comprising:

(a) a cutter supporting section above said guiding section with one of said cutters being connected to an underside of the cutter supporting section and extending downwardly into a respective one of the guide slots, (b) said biasing means being between the cutter supporting section and said cutter guiding section for biasing the cutter supporting section upwardly, and (c) one of the hydraulic pressure members, including a hydraulic cylinder for selectively and reciprocally moving the hydraulic pressure member on the cutter supporting section, and means above and to one side of the cutters for fixing the hydraulic cylinder to the cutter supporting section.

11. A cutting apparatus as defined in claim 10 wherein said control section selectively actuates one of the hydraulic cylinders to move a respective one of the hydraulic pressure members beneath the force applying element for transferring the force of the force applying means to a respective one of the cutter supporting sections.

12. A cutting apparatus for cutting of band shaped raw material consisting essentially of:

a cutter guiding member fixedly located solely above said raw material and including a plurality of vertical guide slots positioned in a side-by-side array with each one of the guide slots being parallel to a feeding direction of said raw material and receiving portions directly below each vertical guide slot and said raw material;

at least two different cutter assemblies; each one of the cutter assemblies including (a) a cutter supporting section above said guiding member, (b) a planner cutter connected to an underside of the cutter supporting section and extending downwardly into a respective one of the guide slots, (c) means between the cutter supporting section and said cutter guiding member for biasing the cutter supporting section upwardly, (d) a hydraulic pressure member, (e) a hydraulic cylinder for selectively and reciprocally moving the hydraulic pressure member on the cutter supporting section, and (f) means above and to one side of the planar cutter for interconnecting the hydraulic cylinder to the cutter supporting section;

each one of the guide slots guiding a respective one of the planar cutters to perpendicularly move downwardly against a plane of said raw material, wherein the planar cutters are positioned in a side-by-side array with each one of the planar cutters being independently movable and having blade or cutting edges in a plane parallel to the feeding direction of the raw material;

at least two of the planar cutters each having a different cutting shape located at a bottom thereof and above the raw material;

means spaced above and transverse to all of the cutter assemblies for selectively applying a force to at least one of the cutter supporting sections to perpendicularly move and press the planar cutter thereunder into said plane of the raw material;

a cutter die for supporting the raw material against the pressing force of the planar cutters and simultaneously interacting with the planar cutters to execute a cutting pattern on the raw material;

a means control section for selectively actuating one of the hydraulic cylinders to move at least one respective hydraulic pressure member beneath a force for transferring said force to the respective one of the cutter supporting sections and each said receiving portion located below and axially aligned with each of said planar cutters collects cut raw material.

13. A cutting apparatus as defined in claim 12, wherein said force applying means includes a single element spaced above and transverse to all of the cutter supporting sections for selectively applying the force to one of the cutter supporting sections.

14. A cutting apparatus as defined in claim 13 wherein said single element is movable only in a vertical direction.

15. A cutting apparatus as defined in claim 12 wherein there are four guide slots and cutter assemblies.

16. A cutting apparatus as defined in claim 1 wherein there are four cutters.

17. A cutting apparatus for cutting of band shaped raw material consisting of:

a cutter guiding member fixedly located solely above said raw material and including a plurality of vertical guide slots positioned in a side-by-side array with each one of the guide slots being parallel to a feeding direction of said raw material and receiving portions directly below each vertical guide slot and said raw materials;

at least two different cutter assemblies; each one of the cutter assemblies including (a) a cutter supporting section above said guiding member, (b) a planar cutter connected to an underside of the cutter supporting section and extending downwardly into a respective one of the guide slots, (c) means between the cutter supporting section and said cutter guiding member for biasing the cutter supporting section upwardly, (d) a hydraulic pressure member, (e) a hydraulic cylinder for selectively and reciprocally moving the hydraulic pressure member on the cutter supporting section, and (f) means above and to one side of the planar cutter for interconnecting the hydraulic cylinder to the cutter supporting section;

each one of the guide slots guiding a respective one of the planar cutters to perpendicularly move downwardly against a plane of said raw material, wherein the planar cutters are positioned in a side-by-side array with each one of the planar cutters being independently movable and having blade or cutting edges in a plane parallel to the feeding direction of the raw material;

at least two of the planar cutters each having a differing cutting shape located at a bottom thereof and above the raw material;

means spaced above and transverse to all of the cutter assemblies for selectively applying a force to at least one of the cutter supporting sections to perpendicularly move and press the planar cutter thereunder into said plane of the raw material;

a cutter die for supporting the raw material against the pressing force of the planar cutters and simultaneously interacting with the planar cutters to execute a cutting pattern on the raw material;

a means control section for selectively actuating one of the hydraulic cylinders to move at least one respective hydraulic pressure member beneath a force for transferring said force to the respective one of the cutter supporting sections and each said receiving portion located below and axially aligned with each of said planar cutters collects cut raw material.

* * * * *